(12) United States Patent
Kurahashi

(10) Patent No.: US 7,007,167 B2
(45) Date of Patent: Feb. 28, 2006

(54) WATERMARKING TECHNIQUE FOR SCALED IMAGE

(75) Inventor: Shigeyuki Kurahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 790 days.

(21) Appl. No.: 09/990,559

(22) Filed: Nov. 21, 2001

(65) Prior Publication Data

US 2002/0062442 A1    May 23, 2002

(30) Foreign Application Priority Data

Nov. 22, 2000    (JP) ............................. 2000-355121

(51) Int. Cl.
*G06F 17/00* (2006.01)
(52) U.S. Cl. ...................... 713/176; 713/179; 382/276
(58) Field of Classification Search ........ 713/176–179; 386/94, 95, 5, 1; 382/100, 232, 276
See application file for complete search history.

(56) References Cited

U.S. PATENT DOCUMENTS 6,310,956 B1 * 10/2001 Morito et al. ............... 380/201
6,374,036 B1 *  4/2002 Ryan et al. ................... 386/94
6,636,615 B1 * 10/2003 Rhoads et al. .............. 382/100

FOREIGN PATENT DOCUMENTS

JP        10-155151        6/1998

OTHER PUBLICATIONS

"Multimedia in the Teaching Space", May 1998, [retrieved from Internet Mar. 16, 2005], http://www.agocg.ac.uk/reports/mmedia/casestdy/ucl/ucl.pdf.*

Geometric moment in image watermarking; Zhang Li; Sam Kwong; Gang Wei; Circuits and Systems, 2003. ISCAS '03. Proceedings of the 2003 International Symposium on vol. 2, May 25-28, 2003 Page(s):II-932-II-935 vol. 2.*
Watermark re-synchronization using log-polar mapping of image autocorrelation; Alattar, A.M.; Meyer, J.; Circuits and Systems, 2003. ISCAS '03. Proceedings of the 2003 International Symposium on vol. 2, May 25-28, 2003 Page (s): II-928-II-931 vol. 2.*
Estimation of attacker's scale and noise variance for QIM-DC watermark embedding; Lagendijk, R.L.; Shterev, I.D.; Image Processing, 2004. ICIP '04. 2004 International Conference on vol. 1, Oct. 24-27, 2004 Page(s):55-58 vol. 1.*

* cited by examiner

*Primary Examiner*—David Jung
(74) *Attorney, Agent, or Firm*—Scully, Scott, Murphy & Presser

(57) ABSTRACT

A watermarking system allowing an appended-type watermark to be easily inserted into a scaled-up/down image without deteriorating the detection accuracy of the appended-type watermark is disclosed. A first scaling factor of an input watermarked image is detected by detecting a copy control watermark from the input watermarked image. It is determined whether a watermark including a second scaling factor is detected from the input watermarked image. When the watermark including the second scaling factor fails to be detected, a second watermark including the first scaling factor is created and embedded into the input watermarked image and further an appended-type watermark is inserted into the input watermarked image. When the watermark including the second scaling factor is detected, the first and second scaling factors are used to calculate a third scaling factor, which is used to detect the appended-type watermark.

10 Claims, 6 Drawing Sheets

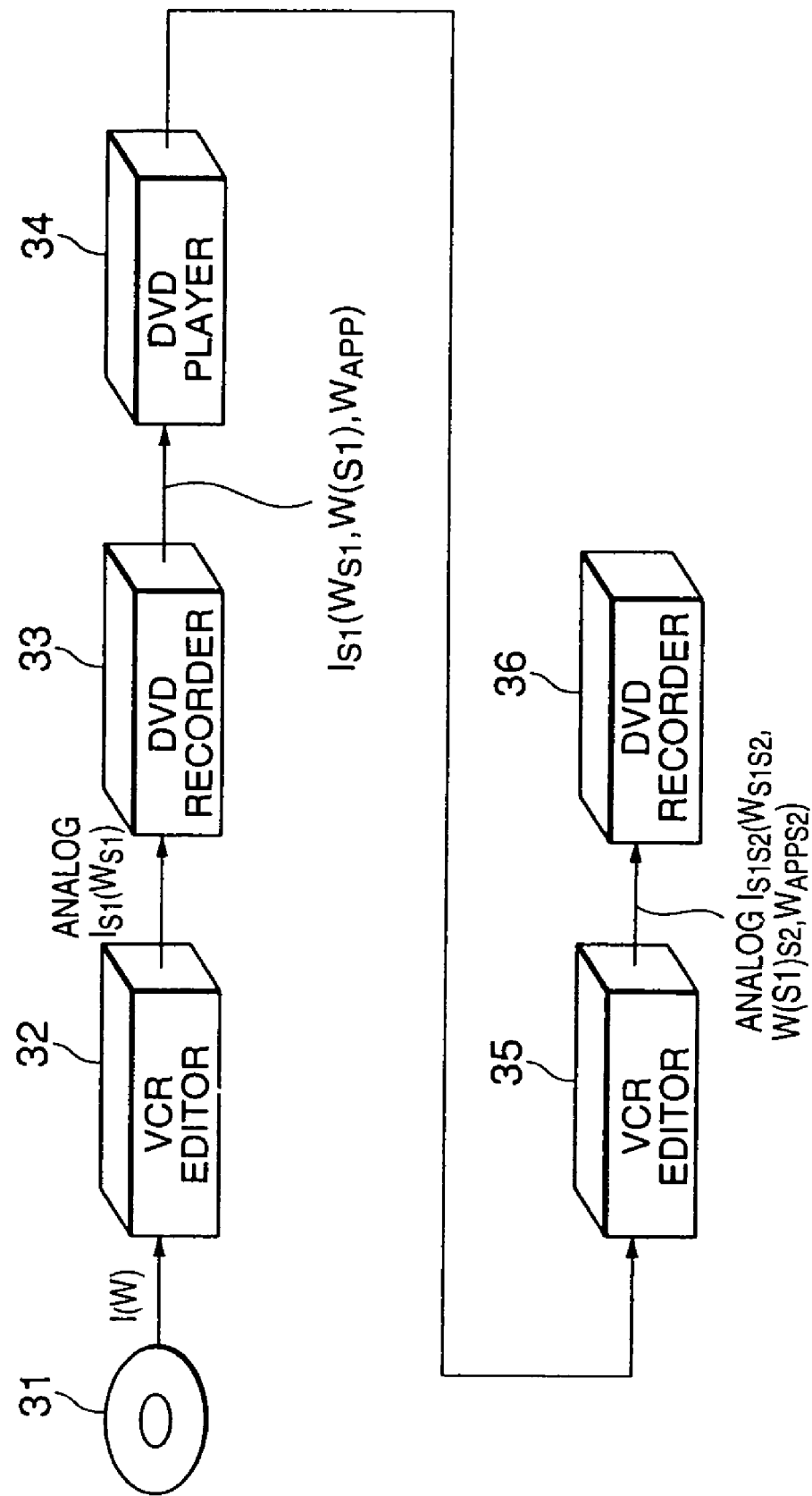

WATERMARKING TECHNIQUE FOR SCALED IMAGE

BACKGROUND OF THE INVENTION

1. Field of the Invention

The present invention relates to image data processing techniques and in particular to a watermarking and watermark detecting system and method for a scaled-up/down image.

2. Description of the Prior Art

With wide-spreading digital satellite broadcasting, the Internet, and DVD (Digital Versatile Disk), etc. in recent years, digital images are becoming easily accessible to users. Since the quality of digital images does not deteriorate when they are copied, copyright protection has been an important issue.

For protection of video contents, motion-picture or still-picture contents and the like, there has been proposed a digital watermarking system. More specifically, at a contents provider, watermark data is embedded into DCT (discrete cosine transform) coefficient domain of compressed image data. At a user terminal, it is checked whether a watermark is embedded in the input image data. When the watermark has been detected from the input image data, the watermark detection result is displayed and thereby copying can be effectively prevented (see Japanese Patent Application Unexamined Publication No. 10-155151).

On the other hand, with the widespread use of DVD recorders, there has been a growing trend to permit a user to copy the content of a DVD only a limited number of times, usually only once. The limited number of times is determined by a copy control watermark previously embedded in the image content of the DVD. In the case of a copy-once watermark indicating that a copy is permitted only once, an appended-type watermark is embedded in the image content when the copy has been performed. When the appended-type watermark is detected from an input image content, the DVD recorder prohibits any copy. Such a copy protection system effectively prevents wide-spreading illegal copies.

Accordingly, reliable detection of such a watermark is a very important issue to enhance the copy protection.

In some cases, however, an input image having a copy control watermark embedded therein may be scaled up/down by using a video editor and the like. It is known that such scaling makes detection of an appended-type watermark difficult. For example, when a watermarked image has been scaled by a horizontal factor Sx and vertical factor Sy, it is necessary to scale an appended-type watermark by the same factor before embedding it into the scaled watermarked image. When the scaling factor of the scaled appended-type watermark is equal to that of the scaled watermarked image, the appended-type watermark can be detected with reliability even if the scaled watermarked image having the scaled appended-type watermark embedded therein is scaled again.

However, in the case where the scaled watermarked image having the scaled appended-type watermark embedded therein is scaled again, the original appended-type watermark is eventually scaled two times. This deteriorates the detection accuracy of the appended-type watermark. On the other hand, when the appended-type watermark is embedded into the scaled image, it is necessary to scale down the appended-type watermark two times. This increases the size of a necessary program.

SUMMARY OF THE INVENTION

It is an object of the present invention to provide watermarking and watermark detecting system and method allowing an appended-type watermark to be inserted into a scaled-up/down image without deteriorating the detection accuracy of the appended-type watermark even if the scaled watermarked image having the scaled appended-type watermark embedded therein is scaled again.

According to the present invention, a watermarking system includes: a first detector for detecting a first scaling factor of an input watermarked image by detecting a first watermark from the input watermarked image, wherein the first watermark includes copy control information used for copy generation limitation; a second detector for detecting a watermark including a second scaling factor from the input watermarked image; and a controller controlling such that, when the second detector fails to detect the watermark including the second scaling factor, a second watermark including the first scaling factor is created and embedded into the input watermarked image and further an appended-type watermark is inserted into the input watermarked image to produce an output watermarked image having the first, second, and appended-type watermarks therein.

The watermarking system further includes an appended-type watermark detector for detecting the appended-type watermark from the input watermarked image based on a third scaling factor calculated from the first scaling factor and the second scaling factor, wherein the controller controls such that, when the second detector has detected the watermark including the second scaling factor, the first and second scaling factors are used to calculate the third scaling factor.

The first detector may search for the first watermark while scaling the input watermarked image in steps of a predetermined small amount. The third scaling factor may be calculated by dividing the first scaling factor by the second scaling factor.

According to another aspect of the present invention, a watermark inserting method includes the steps of: a) detecting a first scaling factor of an input watermarked image by detecting a first watermark from the input watermarked image, wherein the first watermark includes copy control information used for copy generation limitation; b) determining whether a watermark including a second scaling factor is detected from the input watermarked image; and c) when the watermark including the second scaling factor fails to be detected, creating a second watermark including the first scaling factor; and d) embedding the second watermark and an appended-type watermark into the input watermarked image to produce an output watermarked image having the first, second, and appended-type watermarks therein.

The step a) may include the steps of: a.1) scaling the input watermarked image in steps of a predetermined small amount; a.2) determining whether the first watermark is detected from a scaled input watermarked image; and a.3) when the first watermark is detected from an input watermarked image scaled by a scaling factor, determining the scaling factor as the first scaling factor of the input watermarked image.

According to another aspect of the present invention, a watermark detecting method includes the steps of: a) detecting a first scaling factor of an input watermarked image by detecting a first watermark from the input watermarked image, wherein the first watermark includes copy control information used for copy generation limitation; b) determining whether a watermark including a second scaling factor is detected from the input watermarked image; and c)

when the watermark including the second scaling factor has been detected, calculating a third scaling factor from the first scaling factor and the second scaling factor; and d) detecting an appended-type watermark from the input watermarked image based on the third scaling factor.

According to further another aspect of the present invention, a digital image recorder for recording an input watermarked image in a digital recording medium, includes: a first detector for detecting a first scaling factor of the input watermarked image by detecting a first watermark from the input watermarked image, wherein the first watermark includes copy control information used for copy generation limitation; a second detector for detecting a watermark including a second scaling factor from the input watermarked image; an appended-type watermark detector for detecting an appended-type watermark from the input watermarked image based on a third scaling factor calculated from the first scaling factor and the second scaling factor; and a controller controlling such that, when the second detector fails to detect the watermark including the second scaling factor, a second watermark including the first scaling factor is created and embedded into the input watermarked image and further the appended-type watermark is inserted into the input watermarked image to produce an output watermarked image having the first, second, and appended-type watermarks therein, and, when the second detector has detected the watermark including the second scaling factor, the first and second scaling factors are used to calculate the third scaling factor.

As described above, according to the present invention, the appended-type watermark is inserted into an input image without scaling it. Accordingly, there is no need of scaling programs for scaling the appended-type watermark and therefore the insertion of the appended-type watermark becomes easy. Further, the detection accuracy of the appended-type watermark is improved even if the image having the appended-type watermark inserted therein is scaled thereafter.

BRIEF DESCRIPTION OF THE DRAWINGS

FIG. 6 is a block diagram showing a watermarking and watermark detecting system according to a third embodiment of the present invention.

DETAILED DESCRIPTION OF THE PREFERRED EMBODIMENTS

Figure 1:
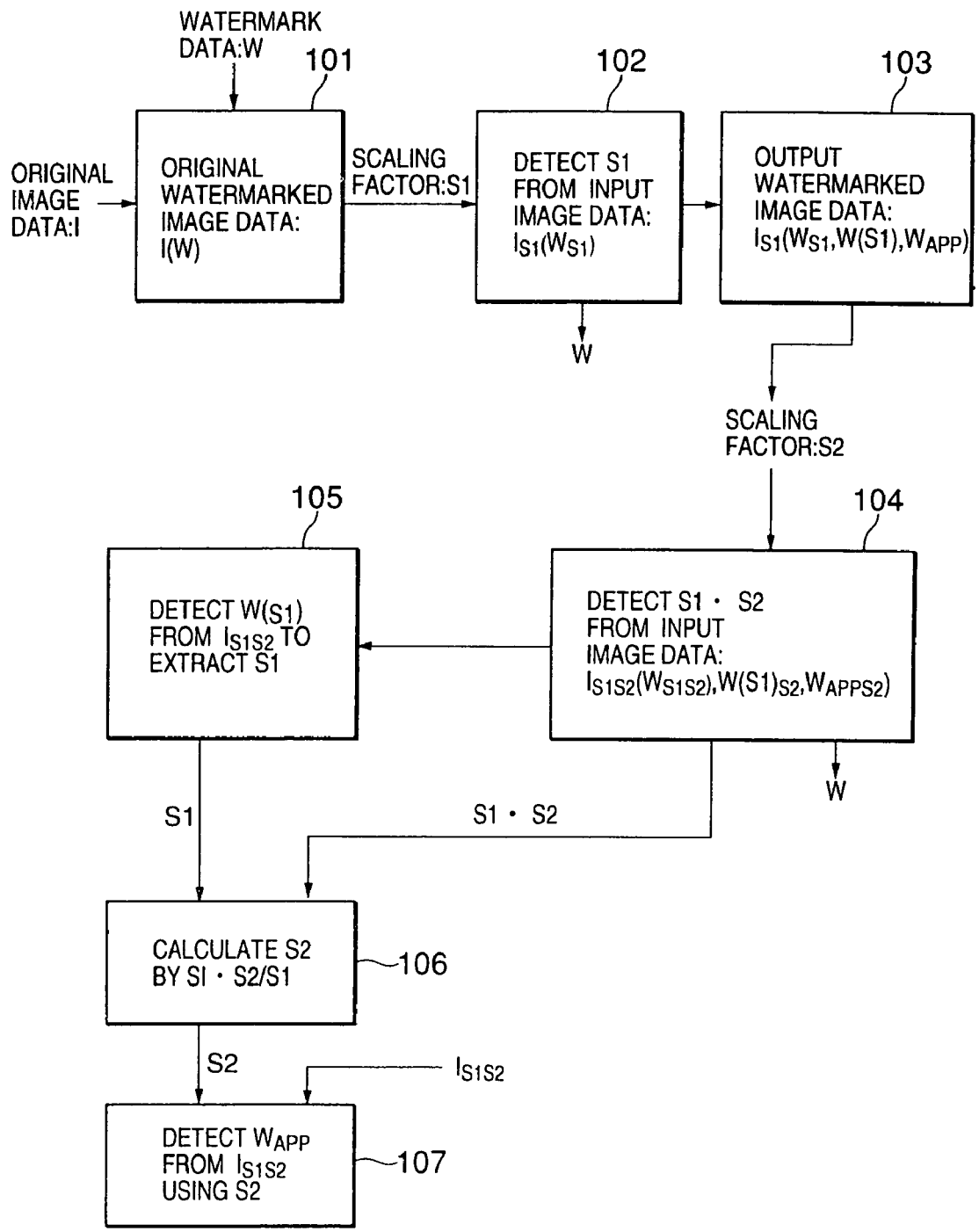
FIG. 1 is a diagram showing a watermarking and watermark detecting system according to a first embodiment of the present invention.

Referring to FIG. 1, it is assumed for simplicity that an original watermarked image I(W) is scaled up/down twice using scaling factors S1 and S2, respectively.

At a content provider 101, a well-known electronic watermarking method is used to embed a watermark W including copy control information into an original image I to produce the original watermarked image I(W). The copy control information is N-bit data that may indicate "copy-once", "copy-protection", or "copy-free".

The original watermarked image I(W) is subjected to scaleup or scaledown, for example, in a tranceiver, an image processor or the like. Here, the original watermarked image I (W) is scaled by the scaling factor S1 to produce a scaled image $I_{S1}$ ($W_{S1}$), wherein not only the image I but also the watermark W is scaled by the same scaling factor S1, which is represented by a suffix "S1".

When inputting the scaled image $I_{S1}$ ($W_{S1}$), a scaling factor detection step 102 is performed at user's equipment such as a DVD recorder. An all scaling search method is used to detect watermark (here, W(S1)) is found in the twice-scaled watermarked image $I_{S1S2}$ ($W_{S1S2}$, $W(S1)_{S2}$, $W_{APPS2}$), a scaling factor is extracted from the scaling factor watermark (here, the scaling factor S1).

The total scaling factor S1×S2 at the step 104 and the extracted scaling factor S1 at the step 105 are used to precisely calculate the scaling factor S2, that is, S2= (S1×S2)/S1 (step 106). Here, since the appended-type watermark $W_{APP}$ has been inserted without scaled at step 103 and then scaled by the scaling factor S2, it can be reliably detected from the twice-scaled watermarked image $I_{S1S2}$ ($W_{S1S2}$, $W(S1)_{S2}$, $W_{APPS2}$) using the detected scaling factor S2 (step 107).

Figure 2:
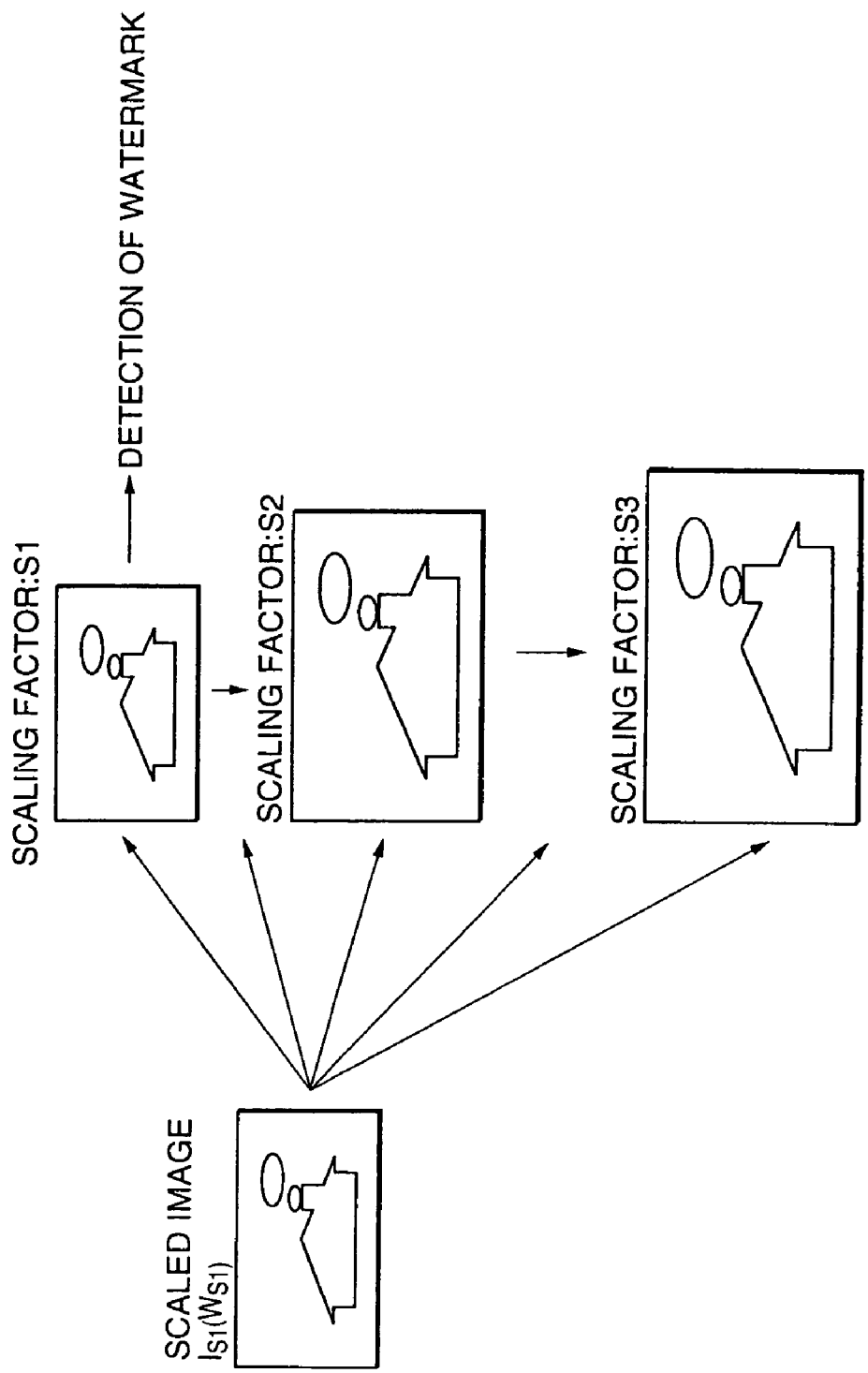
FIG. 2 is a diagram showing a scaling factor detecting method employed in the first embodiment.

Referring to FIG. 2, the all scaling search method will be described. Given the input scaled image $T_{S1}(W_{S1})$, it is sequentially scaled in steps of a predetermined small amount while determining whether a watermark W is detected. When the watermark W is detected, the scaling factor at that time is used as a scaling factor by which the input scaled image $I_{S1}$ ($W_{S1}$) has been scaled. For example, in the case where the input scaled image $I_{S1}$ ($W_{S1}$) has been scaled down by the scaling factor S1, the watermark W is detected when the input scaled image $I_{S1}$ ($W_{S1}$) is scaled up by the scaling factor S1.

Figure 3:
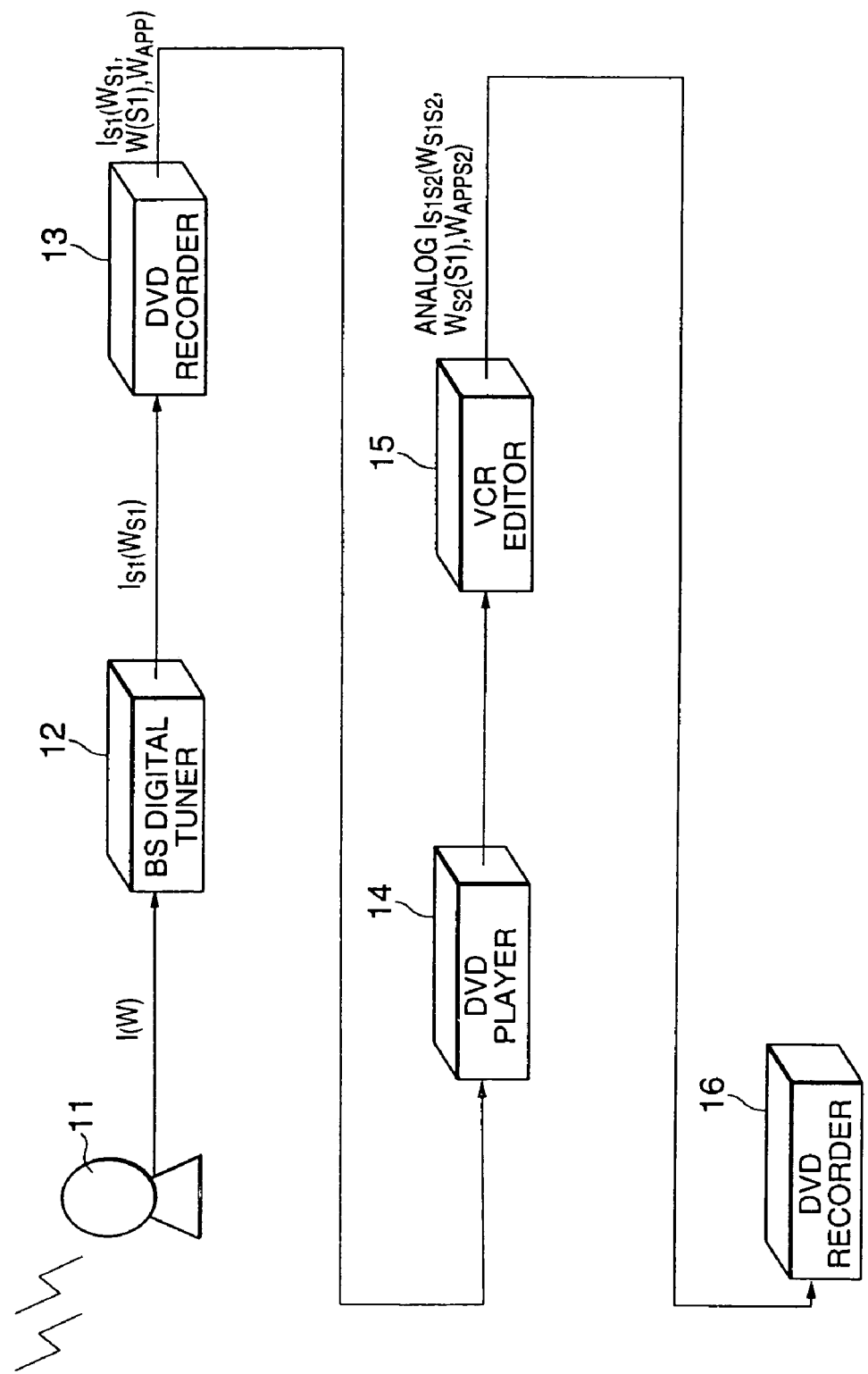
FIG. 3 is a block diagram showing an example of the watermarking and watermark detecting system according to the first embodiment of the present invention.

Referring to FIG. 3, an example of the watermarking and watermark detecting system according to a first embodiment of the present invention will be described. In this example, a BS (Broadcasting Satellite) antenna 11 and a BS digital tuner 12 are provided as a digital image input means. Each of DVD recorders 13 and 16 has a first function of detecting the copy control watermark W, a second function of detecting a scaling factor of the copy control watermark W, a first watermark inserting function of inserting an appended-type watermark $W_{APP}$, a third function of detecting the appended-type watermark $W_{APP}$, and a second watermark inserting function of inserting a scaling factor watermark W(S1). A DVD player 14 performs only DVD playback. A VCR editor 15 is capable of enlarging or reducing an input image.

When receiving digital watermarked image I(W) by the BS antenna 11, the BS digital tuner 12 scales it and outputs a scaled digital image $I_{S1}$ ($W_{S1}$) to the DVD recorder 13. When inputting the scaled image $I_{S1}$ ($W_{S1}$), the DVD recorder 13 performs the all scaling search method to detect a scaling factor S1 from the input scaled image $I_{S1}$ ($W_{S1}$). Thereafter, the DVD recorder 13 inserts an appended-type watermark $W_{APP}$, and embeds a scaling factor watermark W(S1) into the scaled image $I_{S1}$ ($W_{S1}$) to produce a scaled, watermarked image $I_{S1}$ ($W_{S1}$, W(S1), $W_{APP}$), which is recorded into a DVD. The scaling factor watermark W(S1) is a watermark including the detected scaling factor S1.

The digital image $I_{S1}$ ($W_{S1}$, W(S1), $W_{APP}$) is played back by the DVD player 14 and then output to the VCR editor 15.

The VCR editor is converts the digital image $I_{S1}$ ($W_{S1}$, W(S1), $W_{APP}$) into an analog signal, edits it by scaling and the like, and then records the edited signal in a magnetic tape. The VCR editor 15 outputs an analog scaled watermarked image $I_{S1S2}$ ($W_{S1S2}$, $W(S1)_{S2}$, $W_{APPS2}$) to the DVD recorder 16.

When inputting the twice-scaled watermarked image $I_{S1S2}$ ($W_{S1S2}$, $W(S1)_{S2}$, $W_{APPS2}$) from the VCR editor 15, the DVD recorder 16, as described before, detects the total scaling factor S1×S2 and the extracted scaling factor S1 to calculate the scaling factor S2 and then detects the appended-type watermark $W_{APP}$ from the twice-scaled watermarked image $I_{S1S2}$ ($W_{S1S2}$, $W(S1)_{S2}$, $W_{APPS2}$) using the detected scaling factor S2.

Watermark Inserting/Detecting

A watermark inserting and detecting operation of the DVD recorders 13 and 16 will be described with reference to FIG. 4. Here, each of the DVD recorders 13 and 16 has functions as indicated by reference numerals 102–107 of FIG. 1, which may be implemented by a program-controlled processor.

Figure 4:
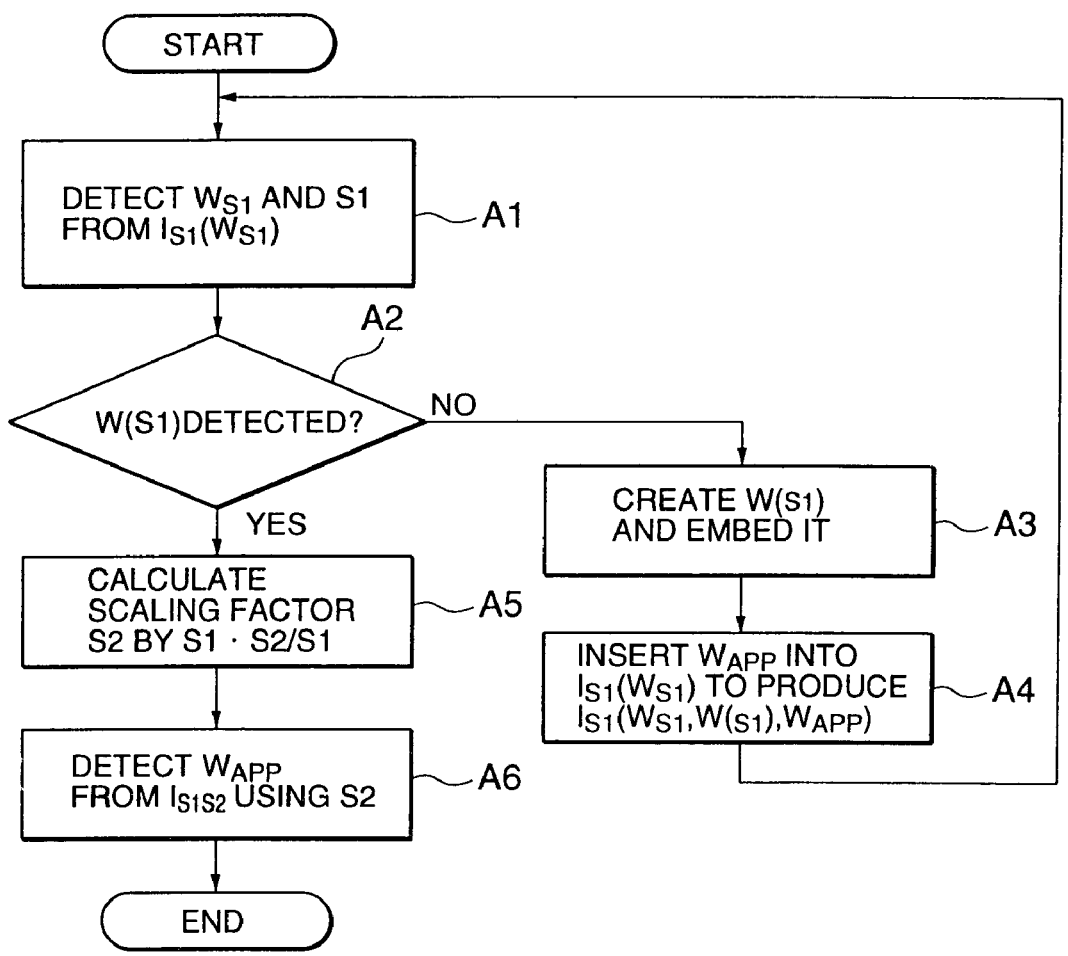
FIG. 4 is a flow chart showing a watermarking and watermark detecting method in the system as shown in FIG. 3.

Referring to FIG. 4, when the DVD recorder 13 has inputted the scaled image $I_{S1}$ ($W_{S1}$) from the BS digital tuner 12, the DVD recorder 13 uses the all scaling factor search method to detect the scaling factor S1 and the watermark $W_{S1}$ from the input scaled-image $I_{S1}$ ($W_{S1}$) (step A1).

Subsequently, the DVD recorder 13 determines whether a scaling factor watermark W(S) including a scaling factor information is detected from the input scaled image $I_{S1}$ ($W_{S1}$) (step A2). At the DVD recorder 13, since the scaled image $I_{S1}$ ($W_{S1}$) has never been copied by a DVD recorder, such a scaling factor watermark W(S) is not found in the scaled image $I_{S1}$ ($W_{S1}$). Accordingly, the DVD recorder 13 creates a scaling factor watermark W(S1) using the scaling factor S1 detected at the step A1 and embeds it into the scaled image $I_{S1}$ ($W_{S1}$) (step A3), and further inserts an appended-type watermark $W_{APP}$ that is not scaled into the scaled image $I_{S1}$ ($W_{S1}$) to produce a scaled, watermarked image $I_{S1}$ ($W_{S1}$, W(S1), $W_{APP}$) (step A4). This scaled, watermarked image $I_{S1}$ ($W_{S1}$, W(S1), $W_{APP}$) is recorded in the DVD.

The scaled and watermarked image $I_{S1}$ ($W_{S1}$, W(S1), $W_{APP}$) is output to the VCR editor 15 through the DVD player 14. After scaling at the VCR editor 15 by the scaling factor S2, the DVD recorder 16 inputs the twice-scaled and watermarked image $I_{S1S2}$ ($W_{S1S2}$, $W(S1)_{S2}$, $W_{APPS2}$) from the VCR editor 15.

When the DVD recorder 16 has inputted the image $I_{S1S2}$ ($W_{S1S2}$, $W(S1)_{S2}$, $W_{APPS2}$), the DVD recorder 16 uses the all scaling factor search method to detect a present scaling factor (here, S1×S2) by detecting the watermark $W_{S1}$ from the input image $I_{S1S2}$ ($W_{S1S2}$, $W(S1)_{S2}$, $W_{APPS2}$) (step A1).

Subsequently, the DVD recorder 16 determines whether a scaling factor watermark W(S) including a scaling factor information is detected from the input image $I_{S1S2}$ ($W_{S1S2}$, $W(S1)_{S2}$, $W_{APPS2}$) (step A2). At the DVD recorder 16, since the input image $I_{S1S2}$ ($W_{S1S2}$, $W(S1)_{S2}$, $W_{APPS2}$) has been copied, the scaling factor watermark W(S1) is found in the input image $I_{S1S2}$ ($W_{S1S2}$, $W(S1)_{S2}$, $W_{APPS2}$). Accordingly, the DVD recorder 16 extracts the scaling factor S1 from the scaling factor watermark W(S1) and calculates the scaling factor S2 from the present scaling factor (here, S1×S2) and the extracted scaling factor S1 (step A5). The DVD recorder 16 uses the calculated scaling factor S2 to detect the appended-type watermark $W_{APP}$ from the image $I_{S1S2}$ ($W_{S1S2}$, $W(S1)_{S2}$, $W_{APPS2}$) (step A6).

As described above, at the step A4, the appended-type watermark $W_{APP}$ is inserted into the scaled image $I_{S1}$ ($W_{S1}$) without scaled. Accordingly, there is no need of scaling program for scaling the appended-type watermark $W_{APP}$ and therefore the insertion of the appended-type watermark $W_{APP}$ (step A4) becomes easy. Further, the detection accuracy of the appended-type watermark $W_{APP}$ (step A6) is improved even if the image having the appended-type watermark $W_{APP}$ inserted therein is scaled thereafter.

In the case where the VCR editor 15 is not provided, the operation of the system is the same as when the scaling factor S2=1.

Figure 5:
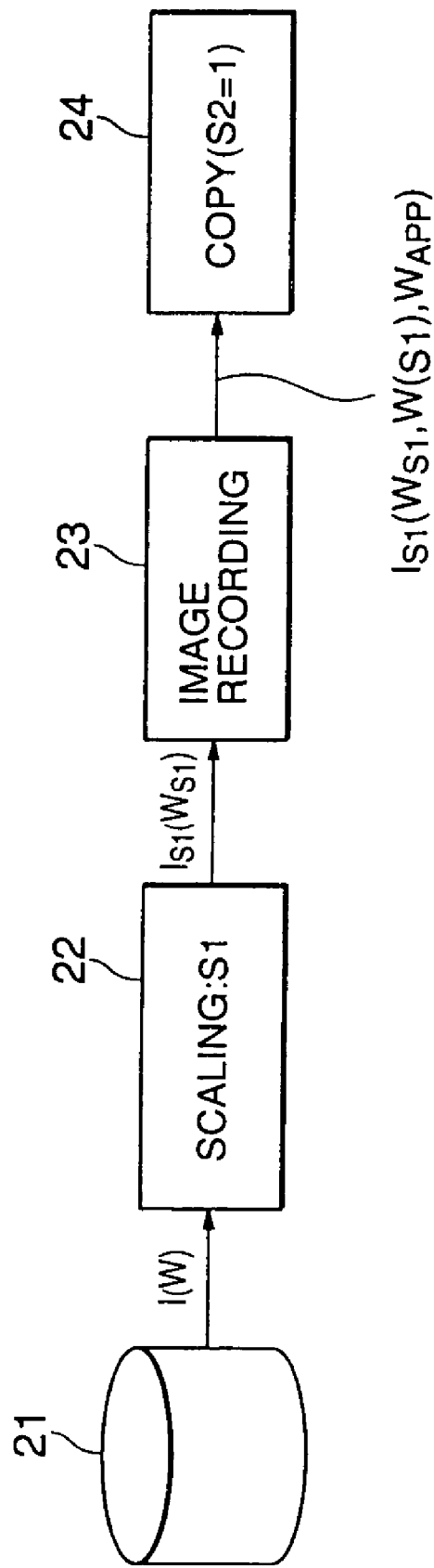
FIG. 5 is a block diagram showing a watermarking and watermark detecting system according to a second embodiment of the present invention.

Referring to FIG. 5, an example of the watermarking and watermark detecting system according to a second embodiment of the prevent invention will be described. In this example, a DVD recorder 21, a VCR editor 22, and DVD recorders 23, 24 are provided.

The DVD recorder 21 records a watermarked image I(W) as an image content. The watermarked image I(W) is scaled by a scaling factor S1 to produce a scaled image $I_{S1}$ ($W_{S1}$) at the VCR editor 22 similar to the VCR editor 15 of FIG. 3. The scaled image $I_{S1}$ ($W_{S1}$) is output to the DVD recorder 23.

When inputting the scaled image $I_{S1}$ ($W_{S1}$), the DVD recorder 23, as described in FIG. 4, determines whether a scaling factor watermark W(S) including a scaling factor information is detected from the input scaled image $I_{S1}$ ($W_{S1}$). At the DVD recorder 23, such a scaling factor watermark W(S) is not found in the scaled image $I_{S1}$ ($W_{S1}$). Accordingly, the DVD recorder 23 creates a scaling factor watermark W(S1) using the scaling factor S1 detected at the step A1 and embeds it into the scaled image $I_{S1}$ ($W_{S1}$), and further inserts an appended-type watermark $W_{APP}$ that is not scaled into the scaled image $I_{S1}$ ($W_{S1}$) to produce a scaled, watermarked image $I_{S1}$ ($W_{S1}$, W(S1), $W_{APP}$). This scaled, watermarked image $I_{S1}$ ($W_{S1}$, W(S1), $W_{APP}$) is recorded in the DVD.

When the scaled and watermarked image $I_{S1}$ ($W_{S1}$, W(S1), $W_{APP}$) stored in the DVD recorder 23 is copied to another DVD, the DVD recorder 24 inputs the image $I_{S2}$ ($W_{S1}$, W(S1), $W_{APP}$) from the DVD recorder 23. The DVD recorder 24 uses the all scaling factor search method to detect a present scaling factor (here, S1) by detecting the watermark $W_{S1}$ from the input image $I_{S1}$ ($W_{S1}$, W(S1), $W_{APP}$).

Subsequently, the DVD recorder 24 determines whether a scaling factor watermark W(S) including a scaling factor information is detected from the input image $I_{S1}$ ($W_{S1}$, W(S1), $W_{APP}$). At the DVD recorder 246, since the input image $I_{S1}$ ($W_{S1}$, W(S1), $W_{APP}$) has been copied at the DVD recorder 23, the scaling factor watermark W(S1) is found. Accordingly, the DVD recorder 24 extracts the scaling factor S1 from the scaling factor watermark W(S1) and calculates the scaling factor S2 by dividing the present scaling factor S1 by the extracted scaling factor S1, that is, S2–1. The DVD recorder 24 uses the calculated scaling factor S2=1 to detect the appended-type watermark $W_{APP}$ from the image $I_{S1}$ ($W_{S1}$, W(S1), $W_{APP}$).

Referring to FIG. 6, an example of the watermarking and watermark detecting system according to a third embodiment of the present invention will be described. In this example, a digital recording medium 31 such as a DVD, a VCR editor 32, a DVD recorder 33, a DVD player 34, a VCR editor 35, and a DVD recorder 36 are provided.

The digital recording medium 31 stores a watermarked image I(W) as an image content. The watermarked image I(W) is scaled by a scaling factor S1 to produce an analog scaled image $I_{S1}$ ($W_{S1}$) at the VCR editor 32 similar to the VCR editor 15 of FIG. 3. The analog scaled image $I_{S1}$ ($W_{S1}$) is output to the DVD recorder 33.

When inputting the analog scaled image $I_{S1}$ ($W_{S1}$), the DVD recorder 33, as described in FIG. 4, determines whether a scaling factor watermark W(S) including a scaling factor information is detected from the input scaled image $I_{S1}$ ($W_{S1}$). At the DVD recorder 33, such a scaling factor watermark W(S) is not found in the scaled image $I_{S1}$ ($W_{S1}$). Accordingly, the DVD recorder 33 creates a scaling factor watermark W(S1) using the scaling factor S1 and embeds it into the scaled image $I_{S1}$ ($W_{S1}$), and further inserts an appended-type watermark $W_{APP}$ that is not scaled into the scaled image $I_{S1}$ ($W_{S1}$) to produce a scaled, watermarked image $I_{S1}$ W(S1), $W_{APP}$). This scaled, watermarked image $I_{S1}$ ($W_{S1}$, W(S1), $W_{APP}$) is recorded in the DVD and output to the DVD player 34. The operations of the DVD player 34, the VCR editor 35, and the DVD recorder 36 are the same as those of the DVD player 14, the VCR editor 15, and the DVD recorder 16 as shown in FIG. 3.

In the second and third embodiments, as similar to the first embodiment, the appended-type watermark $W_{APP}$ is inserted into the scaled image $I_{S1}$ ($W_{S1}$) without scaled. Accordingly, there is no need of scaling program for scaling the appended-type watermark $W_{APP}$ and therefore the insertion of the appended-type watermark $W_{APP}$ becomes easy. Further, the detection accuracy of the appended-type watermark $W_{APP}$ is improved even if the image having the appended-type watermark $W_{APP}$ inserted therein is scaled thereafter.

In the case of copy-once watermark embedded in an image content, when the image contend is copied once at a DVD recorder, an appended-type watermark is appended and therefore a further copy is prohibited. Another embodiment of the present invention may be designed to prohibit a further copy when the image content has been copied a predetermined number of times. For example, each the image content is copied, the appended-type watermark is inserted and, when its copy count reaches the predetermined number of times, a further copy is prohibited. According to the present invention, the appended-type watermark can be detected stably and reliably and therefore copy protection can be made with reliability.

What is claimed is:

1. A watermarking system comprising:
   a first detector for detecting a first scaling factor of an input watermarked image by detecting a first watermark from the input watermarked image, wherein the first watermark includes copy control information used for copy generation limitation;
   a second detector for detecting a watermark including a second scaling factor from the input watermarked image; and
   a controller controlling such that, when the second detector fails to detect the watermark including the second scaling factor, a second watermark including the first scaling factor is created and embedded into the input watermarked image and further an appended-type watermark is inserted into the input watermarked image to produce an output watermarked image having the first, second, and appended type watermarks therein.

2. The watermarking system according to claim 1, further comprising:
   an appended-type watermark detector for detecting the appended-type watermark from the input watermarked image based on a third scaling factor calculated from the first scaling factor and the second scaling factor,
   wherein the controller controls such that, when the second detector has detected the watermark including the second scaling factor, the first and second scaling factors are used to calculate the third scaling factor.

3. The watermarking system according to claim 2, wherein the third scaling factor is calculated by dividing the first scaling factor by the second scaling factor.

4. The watermarking system according to claim 1, wherein the first detector searches for the first watermark while scaling the input watermarked image in steps of a predetermined small amount.

5. A watermark inserting method comprising the steps of:
   a) detecting a first scaling factor of an input watermarked image by detecting a first watermark from the input watermarked image, wherein the first watermark includes copy control information used for copy generation limitation;
   b) determining whether a watermark including a second scaling factor is detected from the input watermarked image;
   c) when the watermark including the second scaling factor fails to be detected, creating a second watermark including the first scaling factor; and
   d) embedding the second watermark and an appended-type watermark into the input watermarked image to produce an output watermarked image having the first, second, and appended-type watermarks therein.

6. The watermark inserting method according to claim 5, wherein the step a) comprises the steps of:
   a.1) scaling the input watermarked image in steps of a predetermined small amount;
   a.2) determining whether the first watermark is detected from a scaled input watermarked image; and
   a.3) when the first watermark is detected from an input watermarked image scaled by a scaling factor, determining the scaling factor as the first scaling factor of the input watermarked image.

7. A watermark detecting method comprising the steps of:
   a) detecting a first scaling factor of an input watermarked image by detecting a first watermark from the input watermarked image, wherein the first watermark includes copy control information used for copy generation limitation;
   b) determining whether a watermark including a second scaling factor is detected from the input watermarked image;
   c) when the watermark including the second scaling factor has been detected, calculating a third scaling factor from the first scaling factor and the second scaling factor; and
   d) detecting an appended-type watermark from the input watermarked image based on the third scaling factor.

8. The watermark detecting method according to claim 7, wherein the step a) comprises the steps of:
   a.1) scaling the input watermarked image in steps of a predetermined small amount;
   a.2) determining whether the first watermark is detected from a scaled input watermarked image; and
   a.3) when the first watermark is detected from an input watermarked image scaled by a scaling factor, determining the scaling factor as the first scaling factor of the input watermarked image.

9. The watermark detecting method according to claim 7, wherein the third scaling factor is calculated by dividing the first scaling factor by the second scaling factor.

10. A digital image recorder for recording an input watermarked image in a digital recording medium, comprising:

a first detector for detecting a first scaling factor of the input watermarked image by detecting a first watermark from the input watermarked image, wherein the first watermark includes copy control information used for copy generation limitation;

a second detector for detecting a watermark including a second scaling factor from the input watermarked image;

an appended-type watermark detector for detecting an appended-type watermark from the input watermarked image based an a third scaling factor calculated from the first scaling factor and the second scaling factor; and a controller controlling such that, when the second detector fails to detect the watermark including the second scaling factor, a second watermark including the first scaling factor is created and embedded into the input watermarked image and further the appended-type watermark is inserted into the input watermarked image to produce an output watermarked image having the first, second, and appended-type watermarks therein, and, when the second detector has detected the watermark including the second scaling factor, the first and second scaling factors are used to calculate the third scaling factor.

* * * * *